United States Patent
Wang et al.

(10) Patent No.: US 11,663,462 B2
(45) Date of Patent: May 30, 2023

(54) MACHINE LEARNING METHOD AND MACHINE LEARNING DEVICE

(71) Applicant: National Central University, Taoyuan (TW)

(72) Inventors: Jia-Ching Wang, New Taipei (TW); Chien-Yao Wang, Yunlin County (TW); Chih-Hsuan Yang, Taoyuan (TW)

(73) Assignee: National Central University, Taoyuan (TW)

( * ) Notice: Subject to any disclaimer, the term of this patent is extended or adjusted under 35 U.S.C. 154(b) by 1190 days.

(21) Appl. No.: 16/030,859

(22) Filed: Jul. 10, 2018

(65) Prior Publication Data

US 2020/0012932 A1   Jan. 9, 2020

(30) Foreign Application Priority Data

Jul. 9, 2018   (TW) .................................. 107123670

(51) Int. Cl.
*G06N 3/08* (2023.01)
*G06N 3/04* (2023.01)

(52) U.S. Cl.
CPC .................. *G06N 3/08* (2013.01); *G06N 3/04* (2013.01)

(58) Field of Classification Search
CPC ........... G06N 3/08; G06N 3/04; G06N 3/0454
See application file for complete search history.

(56) References Cited

U.S. PATENT DOCUMENTS

| | | |
|---|---|---|
| 7,773,193 B2 | 8/2010 | Seo et al. |
| 9,271,133 B2 | 2/2016 | Rodriguez |
| 2019/0339359 A1* | 11/2019 | Wang ...................... G01S 17/32 |

FOREIGN PATENT DOCUMENTS

| | | | |
|---|---|---|---|
| TW | I527023 | 3/2016 | |
| WO | WO-2019199244 A1 * | 10/2019 | ........... G06N 3/0454 |

OTHER PUBLICATIONS

Vardan Papyan, Yaniv Romano, and Michael Elad. 2017. Convolutional neural networks analyzed via convolutional sparse coding. J. Mach. Learn. Res. 18, 1 (Jan. 2017), 2887-2938 (Year: 2017).*
Syed Zubair, Fei Yan, Wenwu Wang, Dictionary learning based sparse coefficients for audio classification with max and average pooling, Digital Signal Processing, vol. 23, Issue 3, 2013 (Year: 2013).*
Li Yuan, Wei Liu, and Yang Li. 2016. Non-negative dictionary based sparse representation classification for ear recognition with occlusion. Neurocomput. 171, Jan. 2016 (Year: 2016).*
(Continued)

*Primary Examiner* — Rehana Perveen
*Assistant Examiner* — Troy A Maust
(74) *Attorney, Agent, or Firm* — JCIPRNET

(57) ABSTRACT

A machine learning method and a machine learning device are provided. The machine learning method includes: receiving an input signal and performing normalization on the input signal; transmitting the normalized input signal to a convolutional layer; and adding a sparse coding layer after the convolutional layer, wherein the sparse coding layer uses dictionary atoms to reconstruct signals on a projection of the normalized input signal passing through the convolutional layer, and the sparse coding layer receives a mini-batch input to refresh the dictionary atoms.

14 Claims, 7 Drawing Sheets

(56) References Cited

OTHER PUBLICATIONS

Chen, Jingbo & Wang, Chengyi & Zhong, Ma & Chen, Jiansheng & He, Dongxu & Ackland, Stephen. (2018). Remote Sensing Scene Classification Based on Convolutional Neural Networks Pre-Trained Using Attention-Guided Sparse Filters. Remote Sensing. 10. 290. 10.3 (Year: 2018).*

Zhang, Ruijie & Shen, Jian & Wei, Fushan & Li, Xiong & Sangaiah, Arun. (2017). Medical image classification based on multi-scale non-negative sparse coding. Artificial Intelligence in Medicine. 83. 10.1016/j.artmed.2017.05.006 (Year: 2017).*

C. Yang, S. Guo and J. S. Tsai, "Evolutionary Fuzzy Block-Matching-Based Camera Raw Image Denoising," in IEEE Transactions on Cybernetics, vol. 47, No. 9, pp. 2862-2871, Sep. 2017, doi: 10.1109/TCYB.2016.2611679 (Year: 2018).*

Mounir, Hammouche & Ghorbel, Enjie & Fleury, Anthony & Ambellouis, Sebastien. (2016). Toward a Real Time View-invariant 3D Action Recognition. 10.5220/0005843607450754 (Year: 2016).*

S. D. S. Al-Shaikhli, M. Y. Yang and B. Rosenhahn, "Brain tumor classification using sparse coding and dictionary learning," 2014 IEEE International Conference on Image Processing (ICIP), 2014, pp. 2774-2778, doi: 10.1109/ICIP.2014.7025561 (Year: 2014).*

Jia-Ching Wang et al, "Gabor-Based Nonumiform Scale-Frequency Map for Environmental Sound Classification in Home Automation", IEEE Transactions on Automation Science and Enginering, Apr. 2014, pp. 607-613.

J. Dennies et al, "Imagin Feature Representation of the Subband Power Distribution for Robust Sound Event Classification", IEEE Transactions on Audio Speech Lang Processing, Feb. 2013, pp. 367-377.

Chien-Yao Wang et al, "Recognition and retrieval of sound events using sparse coding convolutional neural network", IEEE International Conference on Multimedia and Expo, Jul. 11, 2017, pp. 589-594.

* cited by examiner

*Algorithm 1 Proposed Sparse Coding*

Iuput: Signal y, Sorted dictionary D.
Output: List of selected atoms and coefficients $(a_n, c_n)$
Initialization: Residual $R_1 \leftarrow 1$, search index $n \leftarrow 1$ 1. Compute $\Delta\theta_{y,di}$ and update order by $|\cos(\Delta\theta_{y,di})|$.
2. Repeat:
3.     $a_n \leftarrow d_n$
4.     $c_n \leftarrow \min(R_n, |\cos(\Delta\theta_{y,dn})|)$
5.     $R_{n+1} \leftarrow \max(R_n - |\cos(\Delta\theta_{y,dn})|, 0)$
6.     $n \leftarrow n+1$
7. Until $R_n^2 < r \| \min(R_n |\cos(\Delta\theta_{y,dn})|) \|$.

Time Complexity: $O(n)$

FIG. 3

*Algorithm 2 Proposed Sparse Non-Negative Coding*

Iuput: Signal y, Sorted dictionary D.
Output: List of selected atoms and coefficients $(a_n, c_n)$
Initialization: Residual $R_1 \leftarrow 1$, search index $n \leftarrow 1$ 8. Compute $\Delta\theta_{y,di}$ and update atoms order by $|(\Delta\theta_{y,di})|$.
9. $\forall |\Delta\theta_{y,di}| < \pi/2$
10.     $a_n \leftarrow d_n$
11.     $c_n \leftarrow \min(R_n, |\cos(\Delta\theta_{y,dn})|)$
12.     $R_{n+1} \leftarrow \max(R_n - |\cos(\Delta\theta_{y,dn})|, 0)$
13.     $n \leftarrow n+1$
14. Until $R_n^2 < r \| \min(R_n |\cos(\Delta\theta_{y,dn})|) \|$.

Time Complexity: $O(n)$

FIG. 4

```
Algorithm 3 Proposed Sparse Binary Coding
─────────────────────────────────────────
Iuput: Signal y, Sorted dictionary D.
Output: List of selected atoms and coefficients $(a_n, c_n)$
Initialization: Residual $R_1 \leftarrow 1$, search index $n \leftarrow 1$, selected number $m \leftarrow 1$ 1.  Compute $\Delta\theta_{y,di}$ and update order by $|\cos(\Delta\theta_{y,di})|$.
2.  $\forall \ |\Delta\theta_{y,di}| < \pi/2$
3.      If $\cos(\Delta\theta_{y,dn}) > R_n$ :
4.          $n \leftarrow n+1$
5.      Else :
6.          $a_m \leftarrow d_n$
7.          $c_m \leftarrow 1$
8.          $R_{n+1} \leftarrow R_n - \cos(\Delta\theta_{y,dn})$
9.          $n \leftarrow n+1$
10.         $m \leftarrow m+1$
11. Until $R_n^2 < r$ Time Complexity:  $O(n)$
```

FIG. 5

Algorithm 4 Learning Sparse Coding Layer

Iuput: Values of mini-batch input: $Y = \{y_{i,m}\}$;
  Dictionary: $D = \{d_{i,n}\}$;
   Sparse Coefficients of $Y$: $X = \{x_{i,n}\}$
Output: Reconstruction values of $Y$: $\tilde{Y}$ Constrain: $\|y_i\| = 1$, $\|d_i\| = 1$, $x_{i,j} \in [0,1]$ 1. $s = \{\{\|y_{i,m}\|\}\}$
2. Normalize $Y$ by $S$ tomeet the constrain $\|y_i\| = 1$
3. $\{D, X\} \leftarrow \arg\min \|Y - DX\|_2^2 + \gamma \|X\|_p$
4. $R \leftarrow \|Y - DX\|_2^2$
5. $\tilde{Y} = DX$
6. $\forall \hat{y}_i \in \tilde{Y}: \hat{y}_i \leftarrow s_i \cdot \hat{y}_i$

FIG. 10

MACHINE LEARNING METHOD AND MACHINE LEARNING DEVICE

CROSS-REFERENCE TO RELATED APPLICATION

This application claims the priority benefit of Taiwan application serial no. 107123670, filed on Jul. 9, 2018. The entirety of the above-mentioned patent application is hereby incorporated by reference herein and made a part of this specification.

BACKGROUND OF THE INVENTION

Field of the Invention

The invention is related to a machine learning method and a machine learning device, and particularly to a machine learning method and a machine learning device based on sparse coding convolution neural network.

Description of Related Art

Deep learning is popular among the field of machine learning. When continuing voice signal and music signal is processed, the signals may be classified after passing through a convolutional layer of a convolution neural network, a pooling layer and a fully connected layer. However, typical convolution neural network has shortcomings such as high time complexity and low robustness, and therefore more efforts are needed from practitioners of the field to find out how to reduce time complexity required for execution of convolutional neural network and increasing robustness of convolutional neural network.

SUMMARY OF THE INVENTION

The invention provides a machine learning method and a machine learning device, which are not only capable of comprehending and recognizing abstract concept of target but also capable of associating objects that have been seen through retrieving memory, thereby increasing robustness of network while reducing time complexity required for network execution through projection of the dictionary atom.

The invention provides a machine learning method, which integrates convolutional neural network and sparse coding algorithm. The machine learning method includes the following steps: receiving an input signal and performing normalization on the input signal; transmitting the normalized input signal to a convolutional layer; and adding a sparse coding layer after the convolutional layer. The sparse coding layer uses dictionary atoms to reconstruct signals on a projection of the normalized input signal passing through the convolutional layer, and the sparse coding layer receives a mini-batch input to refresh the dictionary atoms.

According to an embodiment of the invention, the step of receiving an input signal and performing normalization on the input signal includes converting the input signal into a time-frequency diagram; using polynomial to perform fitting of frequency-wise strength on the time-frequency diagram; and performing normalization on the width of the fitting result and re-sampling.

According to an embodiment of the invention, a coefficient corresponding to the dictionary atom is a real number ranging from −1 to 1.

According to an embodiment of the invention, the sparse coding layer is located after the fully connected layer. The sparse coding layer performs sparse non-negative coding on the dictionary that is trained through feature vector set, and classifies the type of dictionary atom having a minimum residual or a maximum coefficient.

According to an embodiment of the invention, the sparse coding layer is located before the fully connected layer. The sparse coding layer trains the dictionary respectively with respect to a plurality of convolutional charts of a plurality of channels output by the convolutional layer, uses sparse non-negative coding algorithm to obtain the coefficient corresponding to the dictionary atom, and classifies the type of dictionary atom through channel-wise voting.

According to an embodiment of the invention, the sparse coding layer uses membership function to calculate truth of different channels with respect to different types of dictionary atom, and performs channel-wise voting according to the truth.

According to an embodiment of the invention, the membership function includes a true positive parameter and a true negative parameter.

According to an embodiment of the invention, the membership function includes a precision parameter and a recall parameter.

According to an embodiment of the invention, the sparse coding layer includes a dictionary learning portion and a reconstruction portion. When the residual of the dictionary learning portion is smaller than a threshold value, the reconstruction portion uses product of the dictionary and the coefficient corresponding to the dictionary atom to output the reconstructed data.

According to an embodiment of the invention, the sparse coding layer refreshes the dictionary atom according to the feature of mini-batch.

The invention provides a machine learning device, including a processor and a memory. The memory is coupled to the processor. The processor receives an input signal and performs normalization on the input signal; transmits the normalized input signal to a convolutional layer; and adds a sparse coding layer after the convolutional layer. The sparse coding layer uses dictionary atoms to reconstruct signals on a projection of the normalized input signal passing through the convolutional layer, and the sparse coding layer receives a mini-batch input to refresh the dictionary atoms.

According to an embodiment of the invention, the processor converts the input signal into a time-frequency diagram; uses polynomial to perform fitting of frequency-wise strength on the time-frequency diagram; and performs normalization on the width of the fitting result and re-samples.

According to an embodiment of the invention, a coefficient corresponding to the dictionary atom is a real number ranging from −1 to 1.

According to an embodiment of the invention, the sparse coding layer is located after the fully connected layer. The processor performs sparse non-negative coding on the dictionary that is trained through feature vector set in the sparse coding layer, and classifies the type of dictionary atom having a minimum residual or a maximum coefficient.

According to an embodiment of the invention, the sparse coding layer is located before the fully connected layer. The processor trains the dictionary respectively with respect to a plurality of convolutional charts of a plurality of channels output by the convolutional layer in the sparse coding layer, uses sparse non-negative coding algorithm to obtain the coefficient corresponding to the dictionary atom, and classifies the type of dictionary atom through channel-wise voting.

According to an embodiment of the invention, the processor uses membership function to calculate truth of different channels with respect to different types of dictionary atom in the sparse coding layer, and performs channel-wise voting according to the truth.

According to an embodiment of the invention, the membership function includes a true positive parameter and a true negative parameter.

According to an embodiment of the invention, the membership function includes a precision parameter and a recall parameter.

According to an embodiment of the invention, the sparse coding layer includes a dictionary learning portion and a reconstruction portion. When the residual of the dictionary learning portion is smaller than a threshold value, the processor uses product of the dictionary and the coefficient corresponding to the dictionary atom to output the reconstructed data in the reconstruction portion.

According to an embodiment of the invention, the sparse coding layer refreshes the dictionary atom according to the feature of mini-batch.

Based on the above, the machine learning method and the machine learning device of the invention perform normalization on the input signal and add the sparse coding layer after the convolutional layer, use the dictionary atoms to reconstruct signals on the projection of the normalized input signal passing through the convolutional layer, thereby reducing the time complexity of network. The invention also uses the sparse coding layer to receive a mini-batch input to refresh dictionary atoms, thereby completing training of dictionary and reconstruction of data. Additionally, the invention further provides multi-channel sparse coding capable of directly taking into consideration of abstract feature learned through convolutional weight of different channels.

In order to make the aforementioned features and advantages of the invention more comprehensible, embodiments accompanying figures are described in detail below.

BRIEF DESCRIPTION OF THE DRAWINGS

FIG. 3 is a schematic view of a sparse coding algorithm according to an embodiment of the invention.

FIG. 4 is a schematic view of a sparse non-negative coding algorithm according to an embodiment of the invention.

FIG. 5 is a schematic view of a sparse binary coding algorithm according to an embodiment of the invention.

FIG. 10 is a schematic view of an algorithm of training a sparse coding layer according to an embodiment of the invention.

DESCRIPTION OF EMBODIMENTS

Figure 1:
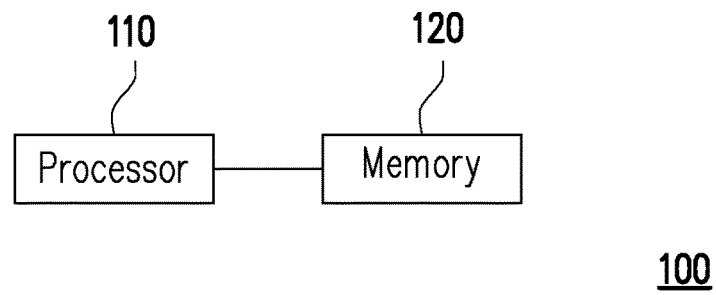
FIG. 1 is a block diagram of a machine learning device according to an embodiment of the invention.

FIG. 1 is a block diagram of a machine learning device according to an embodiment of the invention.

Referring to FIG. 1, a machine learning device 100 of the invention may include a processor 110 and a memory 120. The memory 120 is coupled to the processor 110. The machine learning device 100 may be an electronic device such as a server, a personal computer, a mobile device, a tablet PC and so on. The invention provides no limitation to the type of the machine learning device 100.

The processor 110 may be a central processing unit (CPU), or other programmable general purpose or specific purpose microprocessor, a digital signal processor (DSP), a programmable controller, an application specific integrated circuit (ASIC) or other similar element or a combination of the above.

The memory 120 may be a fixed or a movable random access memory (RAM) in any forms, a read-only memory (ROM), a flash memory, a hard disk drive (HDD), a solid state drive (SSD) or other similar element or a combination of the above. The input device 130 may be an input element such as a keyboard, a mouse and so on.

According to an embodiment of the invention, the machine learning device 100 may receive an input signal (e.g., voice signal or music signal, etc.) through a communication chip (not shown), and the processor 110 executes the convolutional neural network in the memory 120 to perform learning, recognizing, and searching operations on the input signal.

Figure 2:
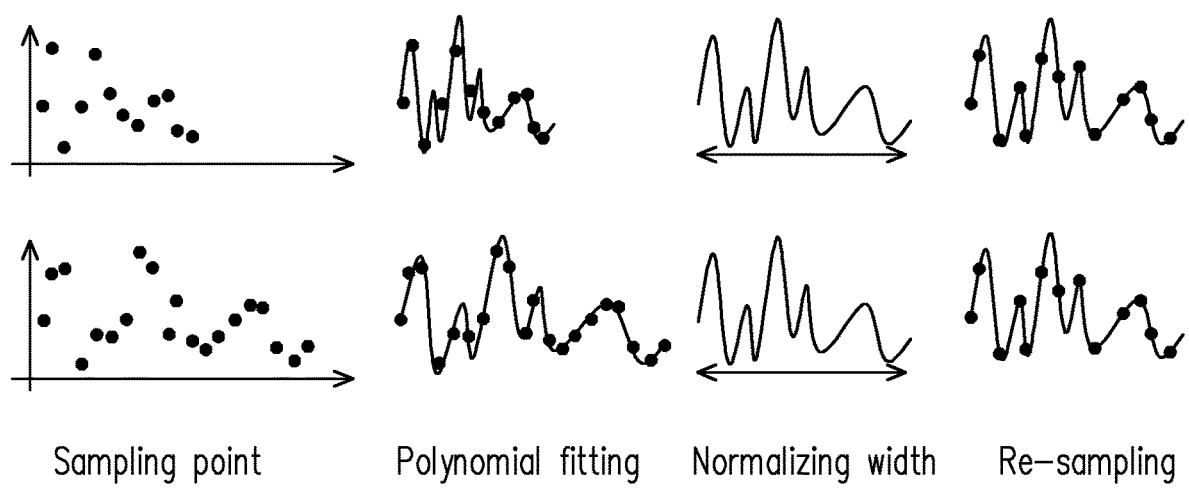
FIG. 2 is a schematic view of performing normalization on signals according to an embodiment of the invention.

FIG. 2 is a schematic view of performing normalization on signals according to an embodiment of the invention.

Referring to FIG. 2, in the pre-processing stage of the convolutional neural network, the processor 110 converts the input signal into a time-frequency diagram by using short-time Fourier transform (STFT), and uses the polynomial to perform fitting of frequency-wise strength on the time-frequency diagram as shown in equation (1) below:

$$(f_i, t) = \Sigma_{n=0}^{N} p_n t^n, i1, 2, \ldots, F \tag{1}$$

Specifically, $f_i$ is the i-th frequency bin of a spectrogram, t is time of the spectrogram, N is the degree of a polynomial function, $p_n$ is the n-th coefficient of a polynomial function, i is the i-th frequency bin of a spectrogram, and F is the size of the spectrogram. Finally, the processor 110 performs normalization on the width of the fitting result (e.g., normalize the width as one) and fits the polynomial for re-sampling. If M sampling points are to be obtained, the time for re-sampling is as shown in equation (2) below:

$$\frac{T \times i}{M}, i = 1, 2, \ldots, T \tag{2}$$

Specifically, i is the i-th frequency bin of the spectrogram, and the equation (2) denotes the spectrogram of size F by T. According to an embodiment, the invention provides a sparse coding algorithm, capable of finding a set of coefficients with respect to the dictionary such that the reconstructed data has the least error and the coefficient is the sparsest. The sparse coding solution of the embodiment is as shown in equation (3) below:

$$\hat{x} = \underset{x}{\operatorname{argmin}} \|y - Dx\|_2^2 + \gamma \|x\|_p \quad (3)$$

Specifically, y is an input signal, D is an over-complete dictionary, γ is lagrange multiplier, and x is a coefficient corresponding to dictionary atom and p∈{0,1}. If the equation (3) is solved by adapt search, the time complexity is $O(n^2)$.

It should be indicated that the sparse coding algorithm of the invention may be executed in the sparse coding layer, and the position of the sparse coding layer varies depending on the use of single-channel sparse coding convolutional neural network or multi-channel sparse coding convolutional neural network. For example, in the single-channel sparse coding convolutional neural network, the sparse coding layer may be disposed after the fully connected layer. In the multi-channel sparse coding convolutional neural network, the sparse coding layer may be disposed after the convolutional layer and before the fully connected layer.

According to another embodiment, the invention provides a sparse coding algorithm, which uses normalized dictionary atoms to reconstruct signals on the projection of the normalized input signals, and limits the coefficient as real number ranging from −1 to 1. The advantage of the sparse coding algorithm of the embodiment is that it is guaranteed that the corresponding coefficient of the selected atom set is most sparse, and it requires the least atoms to reconstruct signals. The sparse coding solution of the embodiment is as shown in equation (4) below:

$$\hat{x} = \underset{x}{\operatorname{argmin}} \|y - proj(D)x\|_2^2 + \gamma \|x\|_p \quad (4)$$

Specifically, proj(D) [y⟨y, $d_1$⟩, y⟨y,$d_2$⟩, ..., y⟨y, $d_n$⟩], ‖y‖=1, ‖$d_i$‖=1, $x_i$∈[−1,1], (a, b) is an inner product of vector a and b, ⟨y, $d_i$⟩ may be expressed as ‖y‖‖$d_i$‖cos($\Delta\theta_{y,d_i}$) and ‖y‖=1, ‖$d_i$‖=1. γ is lagrange multiplier. Therefore, proj(D) may be rewritten as the equation (5) below, and the equation (4) may be rewritten as the equation (6) below.

$$proj(D) = [y\cos(\Delta\theta_{y,d_1}), y\cos(\Delta\theta_{y,d_2}), \ldots, y\cos(\Delta\theta_{y,d_n})] \quad (5)$$

$$\hat{x} = \underset{x}{\operatorname{argmin}} \|1 - \Theta^T x\|_2^2 + \gamma \|x\|_p \quad (6)$$

Specifically, $\theta_y$ is the angle, $\Delta\theta_y$ is the variation of $\theta_y$, γ is lagrange multiplier, $\Theta^T$=[cos($\Delta\theta_{y,d_1}$), cos($\Delta\theta_{y,d_2}$), ..., cos($\Delta\theta_{y,d_n}$)], and θ∈[−π, π].

Since the range of coefficient is limited within a range of −1 to 1, the degree of reconstruction of selected atom at every time does not exceed the length of projection. The coefficient of the selected atoms at every time does not exceed the coefficient of the previously selected atom. Therefore, the sparse coding of the embodiment may be solved through a greedy method. Since cosine function is an even function and the range thereof is from −1 to 1, the order of the selected atoms is like |cos($\Delta\theta_{y,d_i}$)| that is sorted, and the time complexity for sorting is O(n log n). However, $\theta_{d_i}$ may be calculated and sorted in advance. Therefore, when input signal is entered, the sorting of $\Delta\theta_{y,d_i}=\theta_y-\theta_{d_i}$ may be completed within the time complexity of O(log n) (e.g., by using binary sorting), and the searching operation may be completed within the time complexity of O(n), thereby significantly reducing the time complexity as compared with the sparse coding in the foregoing embodiment.

FIG. 3 is a schematic view of a sparse coding algorithm according to an embodiment of the invention. FIG. 4 is a schematic view of a sparse non-negative coding algorithm according to an embodiment of the invention. FIG. 5 is a schematic view of a sparse binary coding algorithm according to an embodiment of the invention.

FIG. 3 is related to reconstruction of data, in the sparse coding algorithm of FIG. 3, input data and sorted dictionary are input and the selected atom and corresponding coefficient are output.

FIG. 4 is related to retrieval of data. In the sparse non-negative coding algorithm of FIG. 4, if the coefficient is limited as non-negative, $x_i$∈[0,1], then the order of selected atom is like sorted cos($\Delta\theta_{y,d_i}$), which is equivalent to finding a cluster that is the most similar to one's own cluster on norm ball.

FIG. 5 is related to classification of type of atoms. In the sparse binary coding algorithm of FIG. 5, if the coefficient is limited as binary, $x_i$∈{0,1}, which is equivalent to overlay dictionary atoms to constitute an input signal.

Figure 6:
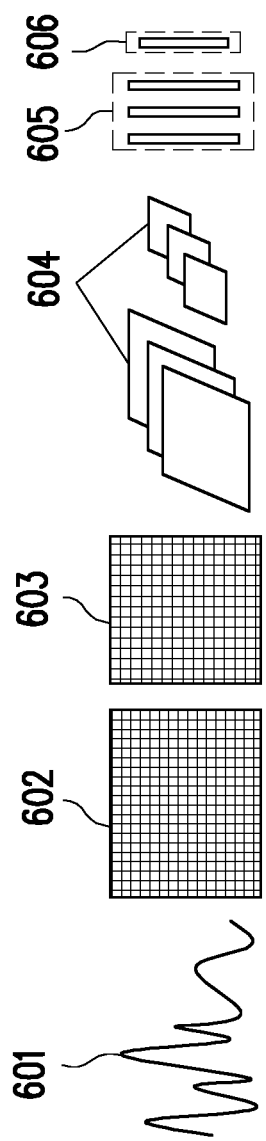
FIG. 6 is a schematic view of a convolutional neural network according to an embodiment of the invention.

FIG. 6 is a schematic view of a convolutional neural network according to an embodiment of the invention.

Referring to FIG. 6, the processor 110 receives an input signal 601 first, generates a corresponding spectrogram 602 or referred to as time-frequency diagram, and then generates a normalized input signal 603. After undergoing through a series of convolutional neural network stage 604 (e.g., convolutional layer, pooling layer), the normalized input signal 603 is transmitted to a fully connected layer 605 and finally classified with a classifier (e.g., softmax). The classifier is as shown in equation (7) below:

$$loss_{softmax}(y, z) = \frac{e^{z_y}}{\sum_{i=1}^{C} e^{z_i}} \quad (7)$$

Specifically, z is the output vector, y is the label, and C is the total number of classes. The retrieval made through convolutional neural network uses an output layer of the fully connected layer to calculate distance L2 on normalized neural code L2 as shown in equation (8) below:

$$distance_{L2}(p,q) = \sqrt{\sum_{i=1}^{n}(q_i-p_i)^2} \quad (8)$$

Specifically, p and q are any two vectors. Finally, the distance may be used as basis for retrieval.

Figure 7:
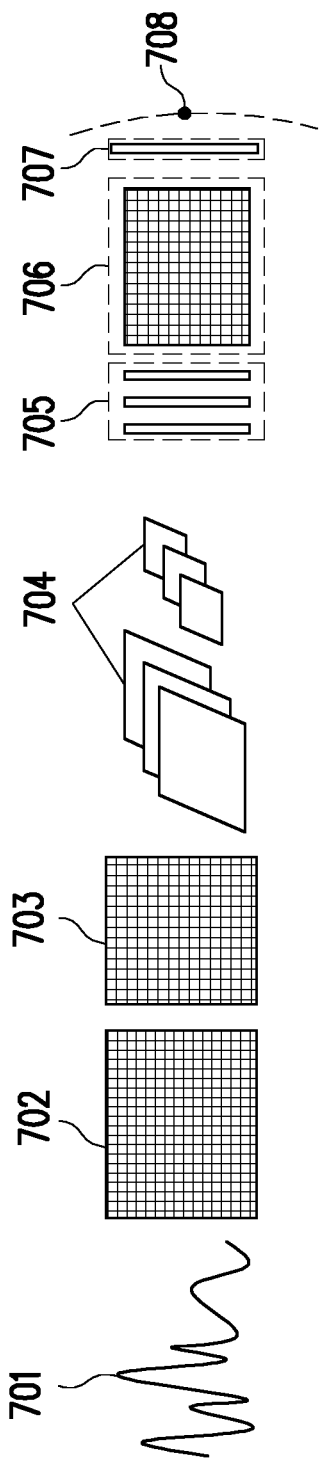
FIG. 7 is a schematic view of a sparse coding convolutional neural network according to an embodiment of the invention.

FIG. 7 is a schematic view of a sparse coding convolution neural network (SC-CNN) according to an embodiment of the invention.

Referring to FIG. 7, the processor 110 receives an input signal 701 first, generates a corresponding spectrogram 702 or referred to as time-frequency diagram, and then generates a normalized input signal 703. After undergoing a series of convolutional neural network stage 704 (e.g., convolutional layer, pooling layer), the normalized input signal 703 is transmitted to a fully connected layer 705. Finally, a dictionary 706 is used to perform sparse coding 707, thereby performing sorting 708 with the minimum residual or maximum coefficient.

Specifically, in the sparse coding convolutional neural network of the embodiment, the trained data is used to perform sparse non-negative coding through the dictionary that is trained with the feature sector set obtained from the convolutional neural network, and finally the type of dictionary atoms that generates the minimum residual or obtains the maximum coefficient is classified as shown in equation (9) below:

$$\text{identity}(y) = \underset{i}{\arg\min}\, r_i(y) \tag{9}$$

Specifically, r represents the residual. If retrieval is to be performed by using the sparse coding convolutional neural network of the embodiment, an exemplar based dictionary of a target database may be retrieved to perform sparse coding, and the minimum residual or maximum coefficient is sorted to serve as a returning order as shown in equation (10) below:

$$\text{score}_{sc}(y,c) = r_c(y) \tag{10}$$

Figure 8:
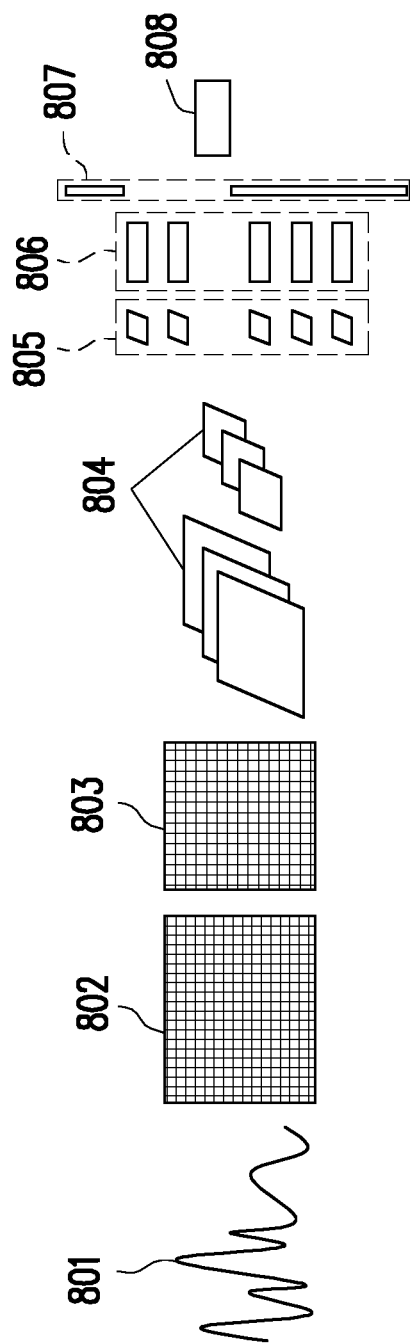
FIG. 8 is a schematic view of multi-channel sparse coding convolutional neural network according to an embodiment of the invention.

Specifically, r represents the residual, and c represents the class. FIG. 8 is a schematic view of multi-channel sparse coding convolutional neural network (MSC-CNN) according to an embodiment of the invention.

Referring to FIG. 8, the processor 110 receives an input signal 801 first, generates a corresponding spectrogram 802 or referred to as time-frequency diagram, and then generates a normalized input signal 803. After undergoing a series of convolutional neural network stage 804 (e.g., convolutional layer, pooling layer), the normalized input signal 803 is transmitted to a final convolutional layer 805. The final convolutional layer 805 has a plurality of channels and therefore the final convolutional layer 805 is followed by a channel-wise dictionary 806, and classification is made through the method of voting 808 after the sparse coding 807 is performed.

The convolutional neural network in the embodiment of the FIG. 6 learns the classifier with a multi-layer sensor with respect to feature maps obtained from the convolutional layer. The sparse coding convolutional neural network in the embodiment of FIG. 7 uses the feature vector obtained from the fully connected layer to perform sparse coding. However, the two recognizing methods mentioned above do not directly take into consideration the abstract feature learned through convolutional weight of different channels. The equation (11) below is a model of convolutional neural network and (single channel) sparse coding convolution neural network. The equation (12) below is a model of multi-channel sparse coding convolutional neural network:

$$p(y, \emptyset(conv_1), \emptyset(conv_2), \ldots \emptyset(conv_n)) \tag{11}$$

$$\frac{1}{n}\sum_{i=1}^{n} p(y, conv_i) \tag{12}$$

Specifically, Ø represents the convolution operation, and p represents the probability. The above convi represents abstract feature obtained from convolutional filter of different channels. In the multi-channel sparse coding convolutional neural network, the processor 110 trains dictionary respectively with respect to convolutional maps of each of the channels, uses the sparse non-negative coding algorithm to obtain sparse coefficient, and finally makes classification through the means of channel-wise voting as shown in equation (13) below:

$$\text{vote}(c) = \sum_{i=1}^{n} \sigma(y_i - c) \tag{13}$$

Specifically, σ represents the Heaviside step function. Since each set of the convolutional weight of the convolutional neural network is equivalent to a set of filters that can obtain a specific discriminative feature, the discriminative feature obtained from each set of the filter has different discriminative ability with respect to different category. In the embodiment, it is proposed to use fuzzy membership function to calculate trust of different channel filters with respect to different categories as shown in equation (14) below:

$$\text{confidence}(i, c) = \begin{cases} \psi(y_i, \text{target}), & \text{if } \psi(y_i, \text{target}) \geq \epsilon \\ 0, & \text{else} \end{cases} \tag{14}$$

Specifically, c represents the class, and confidence represents level of trust of channel filter with respect to categories, ψ is a membership function. The two membership functions of the embodiment are as shown in equation (15) and equation (16) below:

$$\psi_{rr} = (TP+TN)/(P+N) \tag{15}$$

$$\psi_{fs} = 2(\text{precision} \times \text{recall})/(\text{precision}+\text{recall}) \tag{16}$$

Specifically, rr represents recognition rate, fs represents f score, TP represents true positive, TN represents true negative, precision represents accuracy, recall represents recall. After the level of trust is calculated, the decision function is changed as shown in equation (17) below:

$$\text{vote}(c) = \sum_{i=1}^{n} \text{confidence}(i,c) \cdot \sigma(y_i - c) \tag{17}$$

Figure 9:
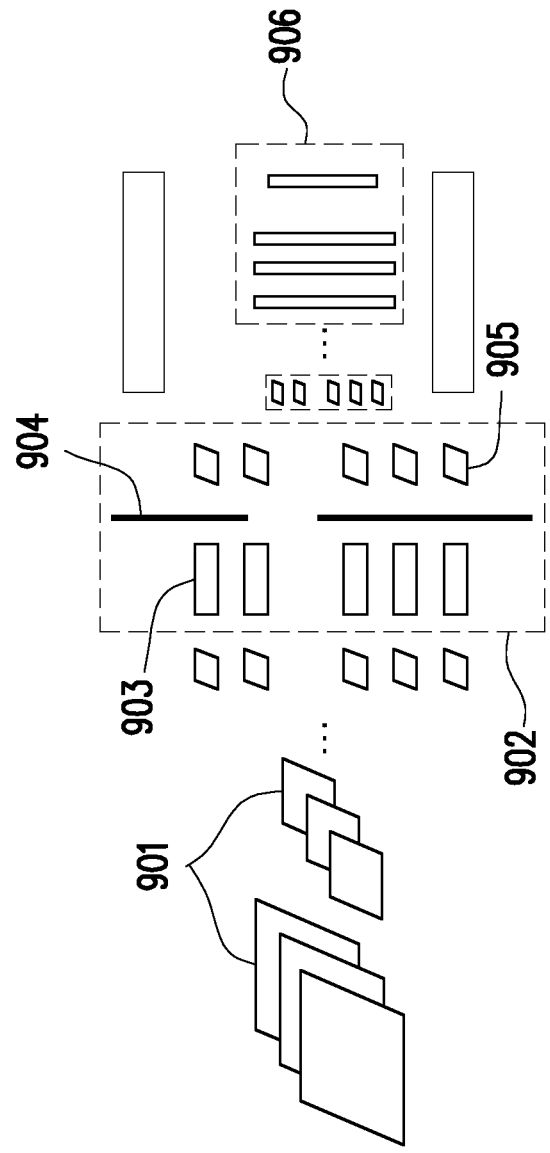
FIG. 9 is a schematic view of a sparse coding layer of multi-channel sparse coding convolutional neural network according to an embodiment of the invention.

Specifically, σ represents the Heaviside step function. FIG. 9 is a schematic view of a sparse coding layer of multi-channel sparse coding convolutional neural network according to an embodiment of the invention. FIG. 10 is a schematic view of an algorithm of training a sparse coding layer according to an embodiment of the invention.

Referring to FIG. 9, a sparse coding layer 902 includes a dictionary learning portion 903, a sparse coding portion 904 and a reconstruction portion 905. The sparse coding layer 902 is located after a convolutional neural network stage 901 and before a fully connected layer 906. In the feedforward stage, a mini-batch input enters the sparse coding layer 902 through a series of calculation in the convolutional neural network stage 901. Through algorithm with dictionary learning batch by batch, it is possible to establish storage of brain memory; through performing the sparse coding on learning dictionary, it is possible to achieve recall function. In the sparse coding layer 902, the mini-batch feature is used to refresh dictionary atoms. The target function of training dictionary is as shown in equation (18) below:

$$\underset{D,X}{\arg\min} \|Y - DX\|_2^2 + \gamma \|X\|_p \tag{18}$$

Specifically, γ is lagrange multiplier, and $\|Y-DX\|_2^2$ is a residual. When the residual is smaller than a threshold value (or referred to as tolerance value), the processor 110 uses DX to transmit the reconstructed data to the next layer.

In the feedforward stage, the multi-channel sparse coding convolutional neural network of the embodiment is the same as convolutional neural network which trains bond weight through inverted transmission algorithm. Y estimated through the sparse coding layer is similar to Y, and the sparse coding layer 902 can directly transmit error to the previous layer in the inverted transmission; therefore, the sparse coding layer 902 may be inserted into the network structure of convolutional neural network in any training epoch. The algorithm of training the sparse coding layer according to an embodiment of the invention is as shown in FIG. 10.

Figure 11:
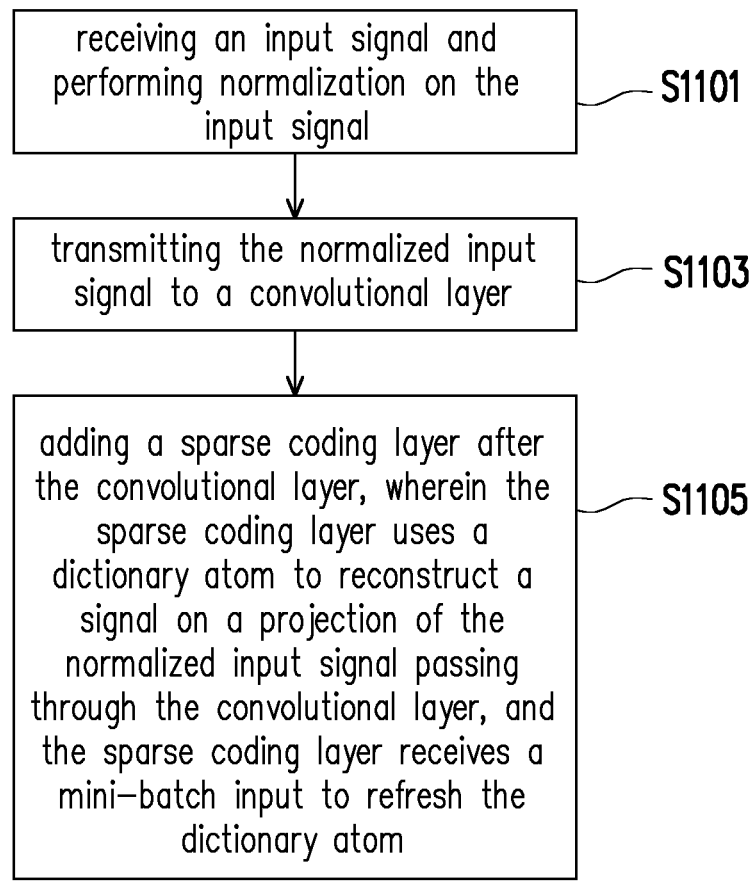
FIG. 11 is a flowchart of a machine learning method according to an embodiment of the invention.

FIG. 11 is a flowchart of a machine learning method according to an embodiment of the invention.

Referring to FIG. 11, in step S1101, an input signal is received and normalized. In step S1103, the normalized input signal is transmitted to the convolutional layer. In step S1105, the sparse coding layer is added after the convolutional layer, wherein the sparse coding layer uses dictionary atoms to reconstruct signals on projection of the normalized input signal passing through the convolutional layer, and the sparse coding layer receives a mini-batch input to refresh dictionary atoms.

In summary, the machine learning method and the machine learning device of the invention perform normalization on the input signal and add the sparse coding layer after the convolutional layer, use the dictionary atoms to reconstruct signals on the projection of the normalized input signal passing through the convolutional layer, thereby reducing the time complexity of network. The invention also uses the sparse coding layer to receive a mini-batch input to refresh dictionary atoms, thereby completing training of dictionary and reconstruction of data. Additionally, the invention further provides multi-channel sparse coding capable of directly taking into consideration of abstract feature learned through convolutional weight of different channels.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A machine learning method, integrating a convolutional neural network and a sparse coding algorithm, comprising:
    receiving an input signal and performing normalization on the input signal;
    transmitting the normalized input signal to a convolutional layer; and
    adding a sparse coding layer after the convolutional layer, wherein the sparse coding layer uses a dictionary atom to reconstruct a signal on a projection of the normalized input signal passing through the convolutional layer, and the sparse coding layer receives a mini-batch input to refresh the dictionary atom,
    wherein when the convolutional neural network is a single-channel sparse coding convolutional neural network, the sparse coding layer is located after a fully connected layer, the sparse coding layer performs a sparse non-negative coding with respect to the dictionary trained through a feature vector set, and performs classification on the type of the dictionary atom having a minimum residual or a maximum coefficient,
    wherein when the convolutional neural network is a multi-channel sparse coding convolutional neural network, the sparse coding layer is located before the fully connected layer, the sparse coding layer respectively trains the dictionary with respect to a plurality of convolutional diagrams of a plurality of channels output by the convolutional layer, uses a sparse non-negative coding algorithm to obtain a coefficient corresponding to the dictionary atom, and performs classification on the type of the dictionary atom through a channel-wise voting;
    wherein a coefficient corresponding to the dictionary atom is a real number ranging from −1 to 1;
    wherein a sparse coding solution $\hat{x}$ in the sparse coding layer is shown as following:

$$\hat{x} = \underset{x}{\mathrm{argmin}} \|y - proj(D)x\|_2^2 + \gamma \|x\|_p;$$

wherein $proj(D) = [y\langle y, d_1 \rangle, y\langle y, d_2 \rangle, \ldots, y\langle y, d_n \rangle]$, $x_i \in [-1, 1]$, $\gamma$ is lagrange multiplier;
wherein $\langle y, d_i \rangle$ is expressed as $\|y\|\|d_i\| \cos(\Delta \theta_{y,d_i})$, $\|y\|=1$, $\|d_i\|=1$, $\theta_y$ is the angle, $\Delta \theta_y$ is the variation of $\theta_y$;
wherein the sparse coding solution $\hat{x}$ and the proj(D) are rewritten as following:

$$proj(D) = [y\cos(\Delta\theta_{y,d_1}), y\cos(\Delta\theta_{y,d_2}), \ldots, (\Delta\theta_{y,d_n})];$$

$$\hat{x} = \underset{x}{\mathrm{argmin}} \|1 - \Theta^T x\|_2^2 + \gamma \|x\|_p;$$

wherein $\Theta^T = [\cos(\Delta\theta_{y,d_1}), \cos(\Delta\theta_{y,d_2}), \ldots, \cos(\Delta\theta_{y,d_n})]$, and $\theta \in [-\pi, \pi]$;
wherein in the multi-channel sparse coding convolutional neural network, training the dictionary respectively with respect to convolutional maps of each of the channels and using the sparse non-negative coding algorithm to obtain a sparse coefficient, and finally making classification through a decision function vote (c) as the following:

$$vote(c) = \sum_{i=1}^{n} confidence(i, c) \cdot \sigma(y_i - c);$$

wherein $\sigma$ is a Heaviside step function, and a level of trust confidence of different channel filters with respect to different categories is calculated by using a fuzzy membership function, and the level of trust confidence is shown as following:

$$confidence(i, c) = \begin{cases} \psi(y_i, \text{target}), & \text{if } \psi(y_i, \text{target}) \geq \in \\ 0, & \text{else} \end{cases};$$

wherein $\psi$ is a membership function.

2. The machine learning method according to claim 1, wherein the step of receiving an input signal and performing normalization on the input signal comprises:
    converting the input signal into a time-frequency diagram;
    using a polynomial to perform a fitting of a frequency-wise strength on the time-frequency diagram; and
    normalizing a width of the fitting result and re-sampling.

3. The machine learning method according to claim 1, wherein the sparse coding layer uses a membership function to calculate a trust level of the different channels with respect to the type of the different dictionary atoms, and performs the channel-wise voting according to the trust level.

4. The machine learning method according to claim 3, wherein the membership function comprises a true positive parameter and a true negative parameter.

5. The machine learning method according to claim 3, wherein the membership function comprises a precision parameter and a recall parameter.

6. The machine learning method according to claim 1, wherein the sparse coding layer comprises a dictionary learning portion and a reconstruction portion, when a residual of the dictionary learning portion is smaller than a threshold value, the reconstruction portion uses a product of the dictionary and a coefficient corresponding to the dictionary atom to output a reconstructed data.

7. The machine learning method according to claim 1, wherein the sparse coding layer refreshes the dictionary atom according a feature of the mini-batch.

8. A machine learning device, comprising:
a processor, configured to integrate a convolutional neural network and a sparse coding algorithm; and
a memory, coupled to the processor, wherein the processor
receives an input signal and performs normalization on the input signal;
transmits the normalized input signal to a convolutional layer; and
adds a sparse coding layer after the convolutional layer,
wherein the sparse coding layer uses a dictionary atom to reconstruct a signal on a projection of the normalized input signal passing through the convolutional layer, and the sparse coding layer receives a mini-batch input to refresh the dictionary atom,
wherein when the convolutional neural network is a single-channel sparse coding convolutional neural network, the sparse coding layer is located after a fully connected layer, the sparse coding layer performs a sparse non-negative coding with respect to the dictionary trained through a feature vector set, and performs classification on the type of the dictionary atom having a minimum residual or a maximum coefficient,
wherein when the convolutional neural network is a multi-channel sparse coding convolutional neural network, the sparse coding layer is located before the fully connected layer, the sparse coding layer respectively trains the dictionary with respect to a plurality of convolutional diagrams of a plurality of channels output by the convolutional layer, uses a sparse non-negative coding algorithm to obtain a coefficient corresponding to the dictionary atom, and performs classification on the type of the dictionary atom through a channel-wise voting;
wherein a coefficient corresponding to the dictionary atom is a real number ranging from −1 to 1;
wherein a sparse coding solution $\hat{x}$ in the sparse coding layer is as shown following:

$$\hat{x} = \mathop{\mathrm{argmin}}_{x} \|\gamma - proj(D)x\|_2^2 + \gamma\|x\|_p;$$

wherein $proj(D) = [y\langle y, d_1\rangle, y\langle y, d_2\rangle, \ldots, y\langle y, d_n\rangle]$, $x_i \in [-1,1]$, $\gamma$ is lagrange multiplier;
wherein $\langle y, d_i\rangle$ is expressed as $\|y\|\|d_i\|\cos(\Delta\theta_{y,d_i})$, $\|y\|=1$, $\|d_i\|=1$, $\theta_y$ is the angle, $\Delta\theta_y$ is the variation of $\theta_y$;
wherein the sparse coding solution $\hat{x}$ and the proj(D) are rewritten as following:

$$proj(D) = y\cos(\Delta\theta_{y,d_1}), y\cos(\Delta\theta_{y,d_2}), \ldots, y\cos(\Delta\theta_{y,d_n})];$$

$$\hat{x} = \mathop{\mathrm{argmin}}_{x} \|1 - \Theta^T x\|_2^2 + \gamma\|x\|_p;$$

wherein $\Theta^T = [\cos(\Delta\theta_{y,d_1}), \cos(\Delta\theta_{y,d_2}), \ldots, \cos(\Delta\theta_{y,d_n})]$, and $\theta \in [-\pi, \pi]$;
wherein in the multi-channel sparse coding convolutional neural network, training the dictionary respectively with respect to convolutional maps of each of the channels and using the sparse non-negative coding algorithm to obtain a sparse coefficient, and finally making classification through a decision function vote (c) as the following:

$$\mathrm{vote}(c) = \sum_{i=1}^{n} \mathrm{confidence}(i, c) \cdot \sigma(y_i - c);$$

wherein $\sigma$ is a Heaviside step function, and a level of trust confidence of different channel filters with respect to different categories is calculated by using a fuzzy membership function, and the level of trust confidence is shown as following:

$$\mathrm{confidence}(i, c) = \begin{cases} \psi(y_i, \mathrm{target}), & \text{if } \psi(y_i, \mathrm{target}) \geq \in) \\ 0, & \text{else} \end{cases};$$

wherein $\psi$ is a membership function.

9. The machine learning device according to claim 8, wherein the processor
converts the input signal into a time-frequency diagram;
uses a polynomial to perform a fitting of a frequency strength on the time-frequency diagram; and
normalizes a width of the fitting result and re-samples.

10. The machine learning device according to claim 8, wherein the processor uses a membership function to calculate a trust level of the different channels with respect to the type of the different dictionary atoms in the sparse coding layer, and performs the channel-wise voting according to the trust level.

11. The machine learning device according to claim 10, wherein the membership function comprises a true positive parameter and a true negative parameter.

12. The machine learning device according to claim 10, wherein the membership function comprises a precision parameter and a recall parameter.

13. The machine learning device according to claim 8, wherein the sparse coding layer comprises a dictionary learning portion and a reconstruction portion, when a residual of the dictionary learning portion is smaller than a threshold value, the processor uses a product of the dictionary and a coefficient corresponding to the dictionary atom to output a reconstructed data in the reconstruction portion.

14. The machine learning device according to claim 8, wherein the processor refreshes the dictionary atom according a feature of the mini-batch in the sparse coding layer.

* * * * *